(12) United States Patent
Moreno

(10) Patent No.: US 6,983,525 B2
(45) Date of Patent: Jan. 10, 2006

(54) ALIGNMENT CLAMP

(75) Inventor: Peter Moreno, Santa Paula, CA (US)

(73) Assignee: Valtra, Inc., Pico Rivera, CA (US)

(*) Notice: Subject to any disclaimer, the term of this patent is extended or adjusted under 35 U.S.C. 154(b) by 76 days.

(21) Appl. No.: 10/752,329

(22) Filed: Jan. 5, 2004

(65) Prior Publication Data

US 2004/0139591 A1    Jul. 22, 2004

Related U.S. Application Data

(60) Provisional application No. 60/438,175, filed on Jan. 7, 2003.

(51) Int. Cl.
*B23Q 3/00*     (2006.01)
*B25B 1/20*     (2006.01)

(52) U.S. Cl. .................. 29/464; 29/466; 29/468; 29/469; 29/272; 269/37; 269/43; 269/909; 228/49.1; 228/49.3; 228/49.4

(58) Field of Classification Search .......... 29/464, 29/466, 469, 468, 271, 272; 269/41, 43, 269/155, 909, 37; 228/49.1, 49.3, 49.4
See application file for complete search history.

(56) References Cited

U.S. PATENT DOCUMENTS

| | | | |
|---|---|---|---|
| 1,940,910 A * | 12/1933 | Hickey | 29/267 |
| 2,108,077 A * | 2/1938 | Robinson | 269/43 |
| 2,398,306 A * | 4/1946 | Hermanson | 403/385 |
| 2,672,839 A | 3/1954 | Neuhaus | |
| 3,015,883 A * | 1/1962 | Brown | 29/271 |
| 3,182,988 A | 5/1965 | Woodall | |
| 3,284,883 A | 11/1966 | Haverfield et al. | |
| 3,342,479 A | 9/1967 | Howe | |
| 3,380,148 A | 4/1968 | Nelson et al. | |
| 3,422,519 A | 1/1969 | Fehlman | |
| 3,467,295 A * | 9/1969 | Watson | 228/49.3 |
| 3,556,508 A | 1/1971 | Varga | |
| 3,952,936 A | 4/1976 | Dearman | |
| 4,108,346 A | 8/1978 | Minix et al. | |

(Continued)

FOREIGN PATENT DOCUMENTS

GB     2185934 A  *  8/1987

*Primary Examiner*—Essama Omgba
(74) *Attorney, Agent, or Firm*—Bruce A. Jagger

(57) ABSTRACT

To align the edges of plates prior to joining them, a generally cylindrical anchor member is spot welded at one location on one of its rims to a plate. A mounting element of a clamp body member slidably engages the anchor member. A force applicator element of the clamp body member is generally laterally spaced from the mounting element. The mounting element includes a generally arcuately extended semi-cylindrical socket portion of such a diameter that it slidably and snugly mounts the socket portion thereon. The rim portions of the anchor member provide a plurality of spot mounting locations for breakably spot welding, brazing or otherwise temporarily attaching the anchor member to a plate or other substrate. At least one of the force applicator or mounting elements is adapted to the incremental application of aligning force on adjacent plates. The body of the clamp bridges between the respective plates that are to be brought into line with one another. Typically, the anchor member holds the mounting element to one plate, and the force applicator element is spaced laterally from the anchor member, and bears on the other plate. This lateral axis is generally approximately parallel to the longitudinal axis of the anchor member.

17 Claims, 7 Drawing Sheets

U.S. PATENT DOCUMENTS

| | | | | |
|---|---|---|---|---|
| 4,195,828 A | * | 4/1980 | Peterson | 269/43 |
| 4,378,937 A | * | 4/1983 | Dearman | 269/6 |
| 4,475,726 A | | 10/1984 | Smith | |
| 4,513,955 A | | 4/1985 | Daubon | |
| 4,708,330 A | | 11/1987 | Ehl | |
| 4,872,709 A | * | 10/1989 | Stack | 285/39 |
| 5,052,608 A | | 10/1991 | McClure | |
| 5,067,696 A | | 11/1991 | Morley | |
| 5,094,435 A | * | 3/1992 | Depperman et al. | 269/43 |
| 5,181,702 A | * | 1/1993 | Pettigrew | 269/93 |
| 5,228,181 A | * | 7/1993 | Ingle | 29/272 |
| 5,560,091 A | | 10/1996 | Labit, Jr. | |
| 5,573,229 A | | 11/1996 | Lycan | |
| 5,640,748 A | * | 6/1997 | Harrison | 29/272 |
| 5,865,430 A | | 2/1999 | Conover et al. | |
| 6,161,296 A | * | 12/2000 | Davio | 33/412 |
| 6,325,277 B1 | * | 12/2001 | Collie | 228/212 |
| 6,327,763 B2 | * | 12/2001 | Stephen | 29/272 |
| 6,641,124 B2 | * | 11/2003 | Melanson | 269/43 |
| 6,651,967 B1 | | 11/2003 | Barber | |

* cited by examiner

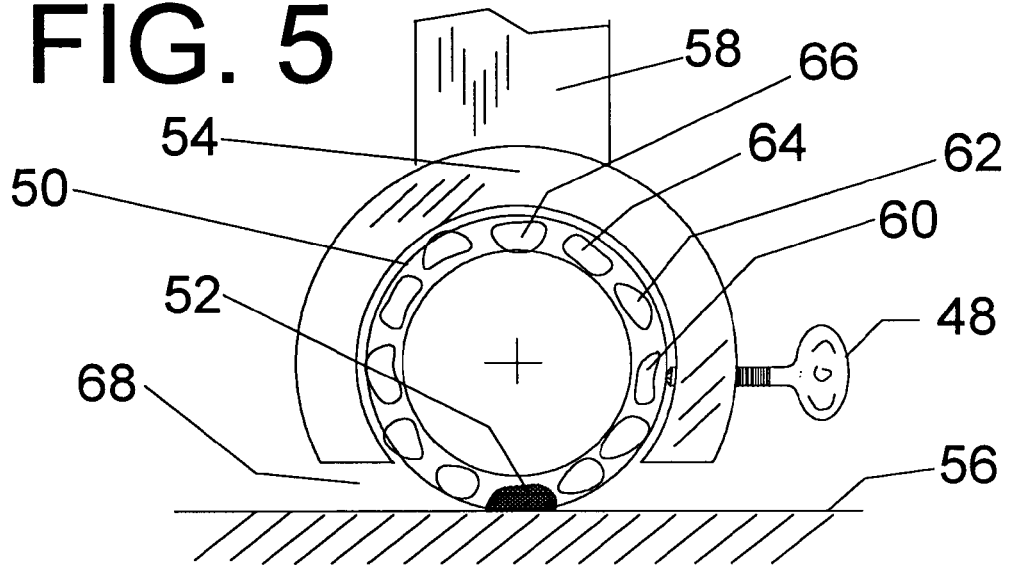
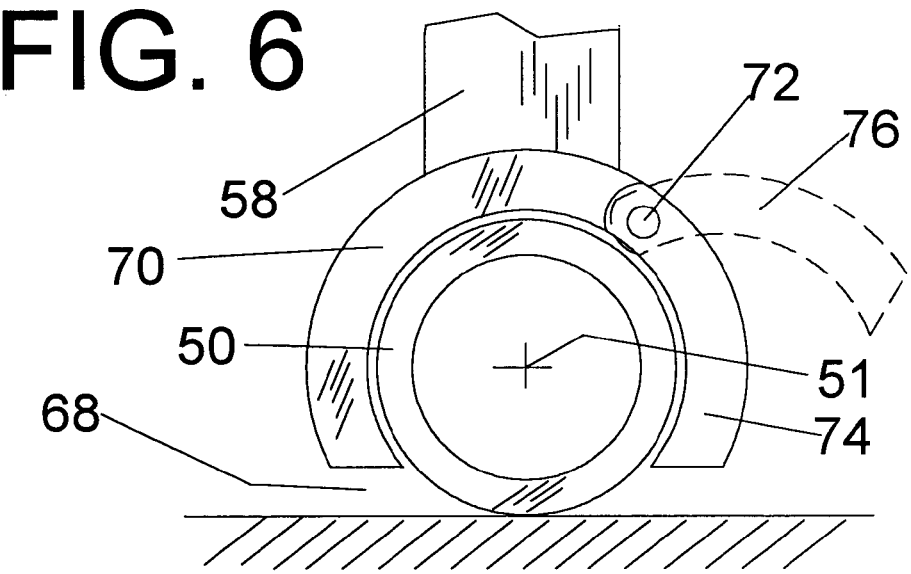

ALIGNMENT CLAMP

RELATED APPLICATIONS

This application claims the benefit of U.S. Provisional Application No. 60/438,175, Filed Jan. 7, 2003.

BACKGROUND OF THE INVENTION

1. Field of the Invention

The invention relates in general to methods and devices for aligning adjacent plates prior to joining them together by welding, brazing, adhesive bonding, or the like.

2. Description of the Prior Art

In the field of welding, a number of clamping devices have been invented to serve the purpose of metal plate alignment. Daubon U.S. Pat. No. 4,513,955 proposes the expedient of an L-shaped member in which a working screw is threaded through one arm to apply pressure on one plate while the other arm is bolted to an angle bracket that is removably tack welded to the other plate. Varga U.S. Pat. No. 3,556,508 proposes a similar expedient except that the L-shaped member is welded to a flat bed and an adjusting screw is threadably mounted in the bed. The flat bed with the permanently mounted L-shaped member is removably tack welded to the plate. These proposed expedients require a specially manufactured flat bed or bracket that has a limited life because of the effects of repeatedly tack welding, breaking, and re-welding it in the same place. Both Varga and Daubon require the use of screws and threaded holes in the same mounting bracket that is consumed by repeated welding in the same spot. The tools for forming threads in holes are typically not immediately available to a welder at the job site where large plates are being welded together. Likewise, the removal and insertion of screws in clamps interrupts the flow of work and slows down the operation. If a small screw is lost it is often not immediately replaceable on a job site.

Conventional practice often comprises just cutting a C-clamp in half to form an L-shaped member much like that shown in Varga. The cut stub is then removably tack welded directly to a plate. Some part of the stub is consumed every time it is tack welded and then broken away from a plate, so the life of the tool is limited. The clamp itself is part of the tool so that when the bed or bracket is tack welded to a plate the clamp may be in the way or it may suffer damage during the welding.

Other prior proposed plate alignment expedients include, for example, Neuhaus, Apparatus for Clamping and Aligning Plates or the Like, U.S. Pat. No. 2,672,839, Howe, Welding Clamps, U.S. Pat. No. 3,342,479; and Minix, Alignment Clamp, U.S. Pat. No. 4,108,346. In general, these other proposed clamping devices are relatively complicated in design, difficult to manipulate, and subject to being easily damaged by the welding operation. In fact, the complicated designs make these devices more costly and time consuming to setup, remove, and maintain. Furthermore, many of these prior devices use a metal rod or a metal strap to feed through a thin gap between the plates to pull in a clamping member behind or underneath the plates to force the alignment. If the two plates are of different thickness, the upper or outer surfaces of the plates will not be brought into perfect alignment by the pulling/pushing force of the clamping member. Under such a situation, there is no way to make the adjustments that are necessary to achieve perfect alignment between the plates. Additionally, after the alignment is achieved and welding is completed, the metal rod or strap with the clamping member has to be removed from behind or underneath the plates. In some occasions, this may be very difficult or even impossible to do, especially where the welded plate is very large and heavy, or it forms part of a closed container. Another inconvenience of these proposed prior art expedients is that the holes left behind after the removal of the metal rods or metal straps have to be welded again to complete the job.

These and other difficulties of the prior art have been overcome according to the present invention.

BRIEF SUMMARY OF THE INVENTION

It is an object of the present invention to provide an alignment clamp and method that are very simple in design so that the manufacturing cost is low, and the cost of use is low. Another object of the invention is to provide an alignment clamp and method, which are very easy to setup before work, easy to remove after work, requires few steps for its use, and is rugged. A further object of the present invention is to provide a clamp and method to align metal plates of uneven or different thickness, or with curved surfaces, by individually adjustable mechanism repeatably usable in multiple setups. Yet another object of the present invention is to enable the clamping and alignment to be done only on one side of the metal or other plates, that is, the exposed upper side or the outer side. No part of the clamping member is behind or underneath the plates so that it has to be removed after the welding or other affixing is completed. The present invention is suitable for welding or other wise joining metal or other plates that are very large and heavy, which form a closed container, ceramic or plastic plates that are adhered or bonded together in other ways, or the like. A still further object of the present invention is to make alignment clamping possible without using a rod, strap or other element to feed through a gap between the two plates. As a result the plates can be joined together without gaps, and there will be no holes left behind to require sealing after the removal of the alignment clamp. Further, it is an objective to provide a simple separate anchor member that is reusable, disposable, and readily available, that can be handled and tack welded or otherwise breakably bonded or adhered to a plate without encumbering the clamp itself, and to which a clamp can be removably mounted without the use of additional tools. In addition, the traces left on the plate by spot mounting are easily removed during normal cleanup operations. It is an object of the present invention to provide an alignment clamp assembly and method that are adapted to all plate geometry, all materials of construction, and all methods and forms of plate joinder. Suitable plate materials include, for example, metals, ceramics, plastics, masonry, wood, and the like. Suitable plate joinder and breakable spot mounting methods and materials include, for example, arc or gas welding, plasma spray, brazing, soldering, sonic welding, solvent bonding, adhesive bonding, and the like. The methods and materials used for the purposes of plate joinder need not be the same as those used for breakable spot mounting purposes on the same job. Additional objectives will become apparent to those skilled in the art from the following teachings.

The present invention has been developed in response to the current state of the art, and in particular, in response to these and other problems and needs that have not been fully or completely solved by currently available expedients. Thus, it is an overall object of the present invention to effectively resolve at least the problems and shortcomings identified herein. To acquaint persons skilled in the pertinent arts most closely related to the present invention, a preferred embodiment of an alignment clamp that illustrates a best mode now contemplated for putting the invention into practice is described herein by, and with reference to, the annexed drawings that form a part of the specification. The exemplary alignment clamp assembly is described in detail without attempting to show all of the various forms and modifications in which the invention might be embodied. As such, the embodiments shown and described herein are illustrative, and as will become apparent to those skilled in the arts, can be modified in numerous ways within the scope and spirit of the invention, the invention being measured by the appended claims and not by the details of the specification or drawings. In a preferred embodiment of the invention, a clamp body member, for example, slidably engages an anchor member. The clamp body member includes for example, a force applicator element generally laterally spaced from a mounting element. The mounting element includes, for example, a generally arcuately extended semi-cylindrical socket portion. The generally cylindrical exterior of the anchor member is for example, of such a diameter that it slidably and snugly mounts the sectorial socket portion thereon. The axially opposed ends of the anchor member define end rim or circumference portions. The rim portions provide a plurality of spot mounting locations for spot welding, brazing or otherwise temporarily attaching the anchor member to a plate or other substrate. At least one of the force applicator or mounting elements is preferably adapted to the incremental application of force on an adjacent plate. According to one preferred embodiment, the body of the clamp bridges between the respective plates that are to be brought into line with one another. In this embodiment, the anchor member holds the mounting element to one plate, and the force applicator element is spaced from the anchor member generally along a lateral axis and bears on the other plate. This lateral axis is generally approximately parallel to the longitudinal axis of the anchor member.

In operation, in one preferred embodiment, a generally cylindrical anchor member is breakably spot mounted to a plate at one mounting location on a rim of the anchor member. A generally arcuately extended semi-cylindrical socket portion of the mounting element on a clamp body member is slidably mounted to the anchor member. A force applicator element on the clamp body member is positioned in engaging relationship to a second plate. Alignment between the respective plates is accomplished by incrementally adjusting one or both of the mounting or force applicator elements until the plates are brought to the desired alignment.

Other objects, advantages, and novel features of the present invention will become more fully apparent from the following detailed description of the invention when considered in conjunction with the accompanying drawings, or may be learned by the practice of the invention as set forth herein.

BRIEF DESCRIPTION OF THE DRAWINGS

The present invention provides its benefits across a broad spectrum of alignment clamp devices. While the description which follows hereinafter is meant to be representative of a number of such applications, it is not exhaustive. As those skilled in the art will recognize, the basic apparatus taught herein can be readily adapted to many uses. This specification and the claims appended hereto should be accorded a breadth in keeping with the scope and spirit of the invention being disclosed despite what might appear to be limiting language imposed by the requirements of referring to the specific examples disclosed.

Referring particularly to the drawings for the purposes of illustrating the invention and its presently understood best mode only and not limitation:

FIG. 5 is a partial rear elevational view of a preferred embodiment of an alignment clamp assembly showing a plurality of spot mounting locations on a rim portion of an anchor member.

FIG. 6 is a partial elevational view of another preferred embodiment of an alignment clamp assembly of the present invention showing a side mountable mounting element.

DETAILED DESCRIPTION OF THE PREFERRED EMBODIMENTS

Figure 1:
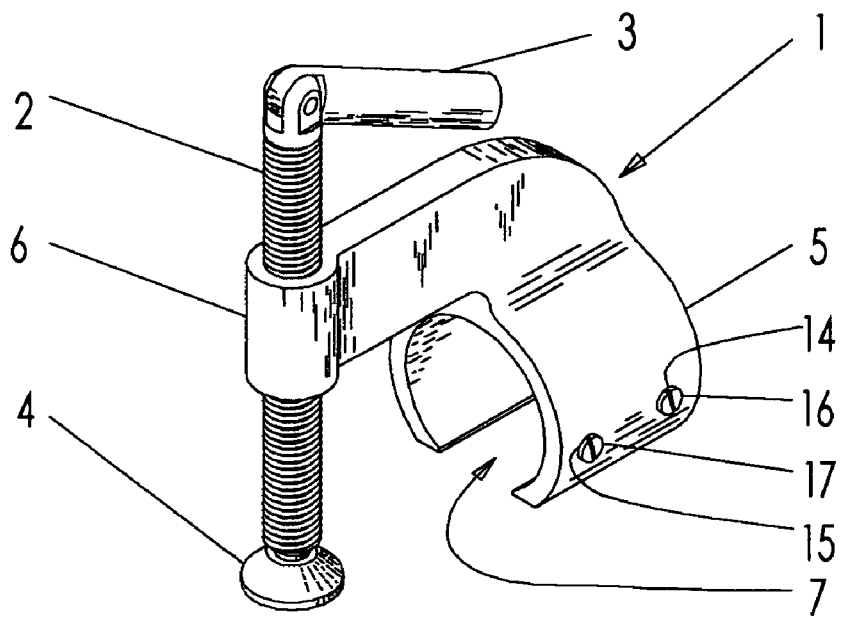
FIG. 1 is a perspective view of a preferred embodiment of a clamp body member according to the present invention.

Referring now to the drawings wherein like reference numerals designate identical or corresponding parts throughout the several views. It is to be understood that the drawings are diagrammatic and schematic representations of various embodiments of the invention, and are not to be construed as limiting the invention in any way. The use of words and phrases herein with reference to specific embodiments is not intended to limit the meanings of such words and phrases to those specific embodiments. Words and phrases herein are intended to have their ordinary meanings, unless a specific definition is set forth at length herein.

Figure 2:
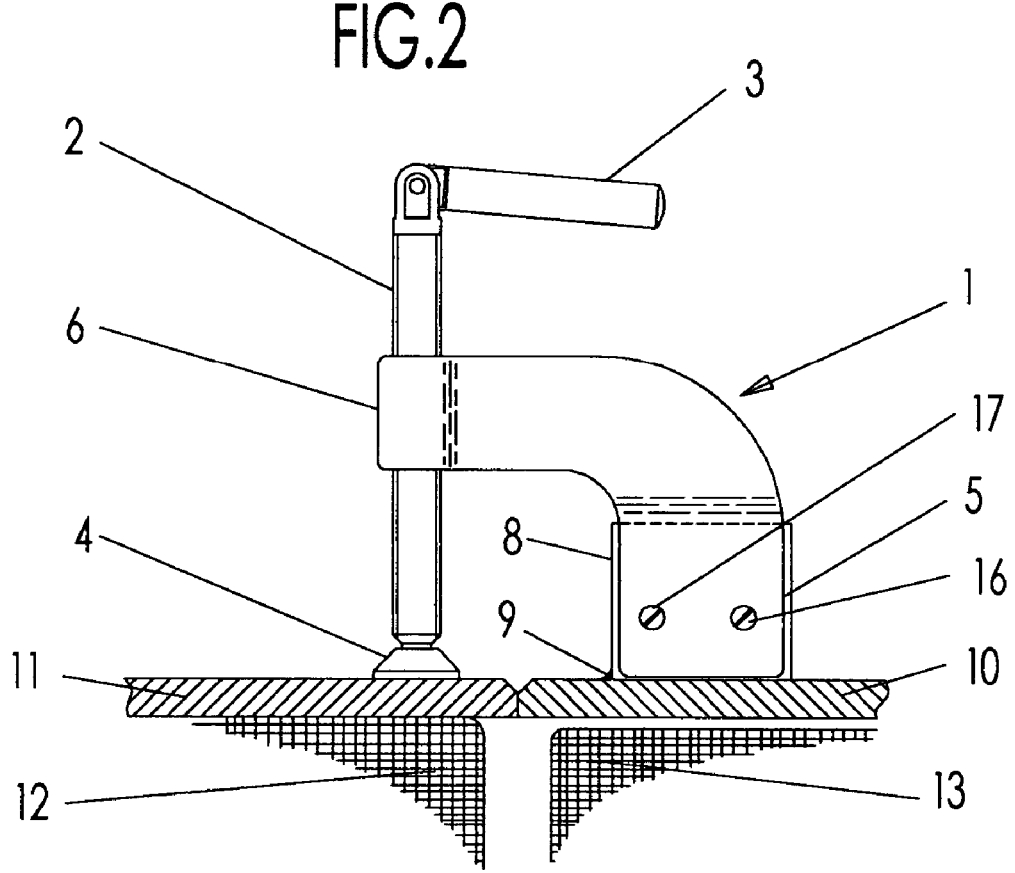
FIG. 2 is a side elevational view of the embodiment of FIG. 1 showing the clamp body member aligningly mounted in an alignment clamp assembly with an anchor member to adjacent plates.
Figure 3:
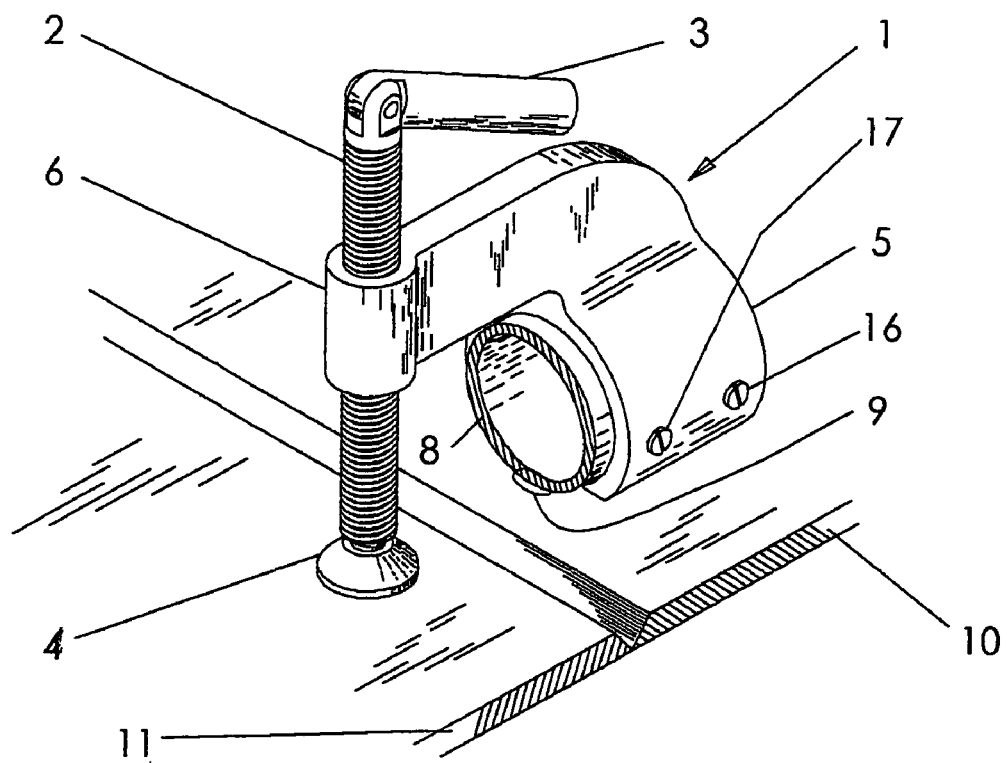
FIG. 3 is a perspective view of the embodiment of FIG. 2.

Referring particularly to FIGS. 1 through 3 of the drawings, there is illustrated generally at 1 a clamp body member at one end of which is an internally threaded block 6, and at the laterally opposed other end is a mounting element 5. A force applicator element in the form of a screw 2 is threadably received in block 6. A floating pad or jaw 4 is mounted on the end of element 2 to provide accommodation for small misalignments or irregularities in the plates to which the alignment clamp assembly is to be applied. In this illustrated embodiment, element 2 is activated by the appropriate manipulation of handle 3. Handle 3 is pivotally attached to the upper end of the threaded force applicator element. Handle 3 is spring loaded and foldable so that it can be used at the upright position for quick turning of the applicator element and at the horizontal position for stronger turning torque. Mounting element 5 comprises generally arcuately extending arms that in this embodiment define an arcuately extended semi-cylindrical socket portion 7. The alignment clamp assembly includes an anchor member 8, which in this embodiment comprises a short generally cylindrical section of pipe. Member 8 is breakably affixed to first plate 10 by means of a breakable spot mounting 9 at a location on the rim on one end of member 8. Initially, first plate 10 is supported on first support 13 at a location where it is out of alignment with the adjacent edge of second plate 11. Second plate 11 is supported on second support 12. The socket portion 7 and the anchor member 8 are proportioned so that the sectorial socket portion slides over the anchor member. Where the plates are oriented at an angle to the horizon such that the socket portion 7 would slide off of the anchor member 8 under the urging of gravity, a detent is preferably provided to hold the socket portion and the anchor member in assembled configuration. Two detent elements in the form of screws 16 and 17 are illustrated at 16 and 17, respectively. As will be understood by those skilled in the art, others forms of detent can be employed if desired. The application of force by element 2 causes the adjacent edges to be brought into alignment as shown particularly in FIG. 2. Such application of force causes first plate 10 to be lifted off of its support 13.

Figure 4:
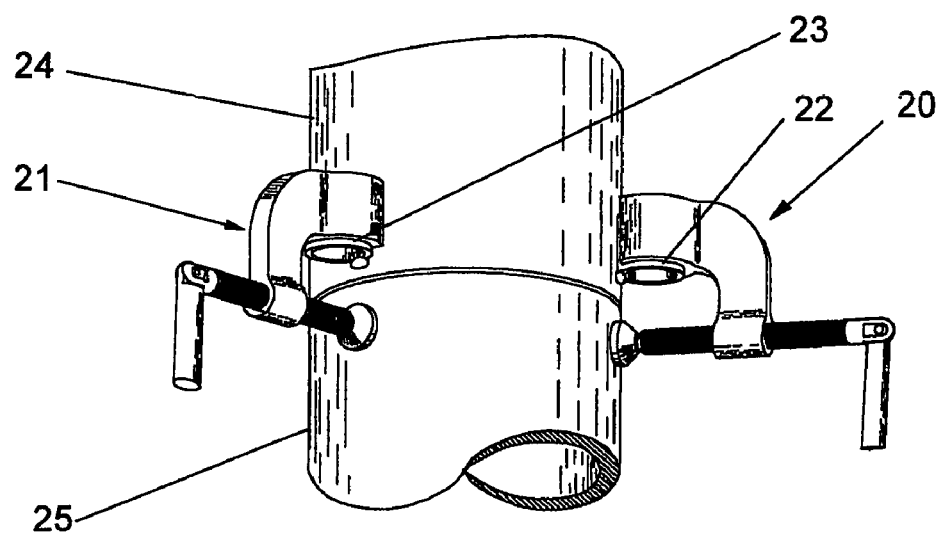
FIG. 4 is a side view of two clamp body members of the embodiment of FIG. 1 aligningly associated with two cylindrical plates.
Figure 7:
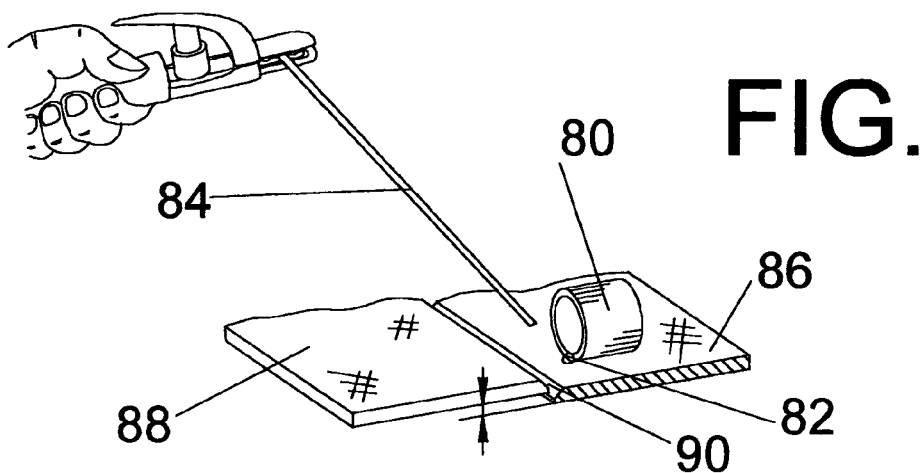
FIG. 7 is a perspective view of the attachment by breakably spot welding of an anchor member to a flat plate illustrating the best mode of practicing the invention as presently understood.
Figure 8:
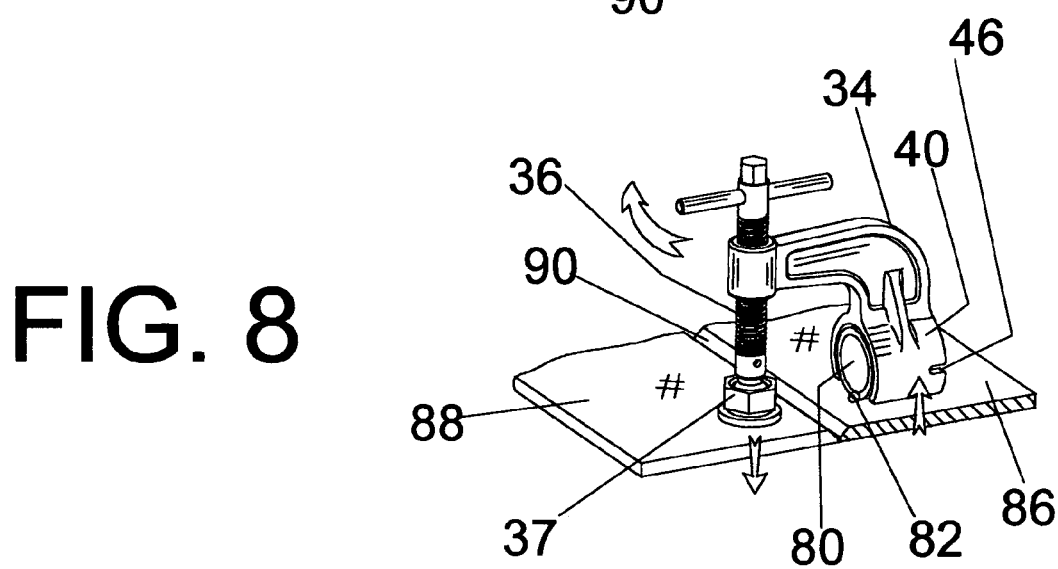
FIG. 8 is a perspective view of the embodiment of FIG. 7 illustrating the forces involved in utilizing a preferred embodiment of an alignment clamp assembly according to the present invention.

With particular reference to FIG. 4, plates in the form of cylindrical pipes 24 and 25 are brought into alignment by the provision of three alignment clamp assemblies spaced generally equal angularly around the cylindrical pipes. The third alignment clamp assembly is hidden from view behind the pipes. The first and second clamp bodies 20 and 21, respectively, are mounted in operative association with first pipe 24 through anchor members 22 and 23, respectively. The three clamp assemblies function together much as a conventional tree-jawed chuck in a lathe. Precise alignment of the adjacent edges of pipes 24 and 25 is accomplished by adjusting the force applicator elements relative to one another.

The clamp body 58 illustrated in FIGS. 5 and 6 is mounted at one end to an anchor member 50. The arms of mounting element 54 (FIG. 5) encircle anchor member 50 through an arc of more than 180 degrees so as to retain the clamp body in assembled configuration to the anchor member. That is, the mounting element is defined by a generally arcuately extended semi-cylindrical socket portion. A sector is missing from the wall of the generally cylindrical mounting element so as to provide the clearance indicated at 68. Clearance 68 permits the alignment clamp assembly to be formed without impediment from any engagement with the surface of the plate 56. Clearance 68 also permits some rotational alignment of the clamp body as may be desired to effect alignment between a particular pair of plates. The permitted rotation is less than approximately 90 degrees because the partially encircling walls of the mounting element 54 extend through an arc of substantially more than 180 degrees. The longitudinal axis 51 (FIG. 6) of the anchor member 50 is generally coincident with that of the mounting element 54, and is approximately parallel with, if not coincident with, the lateral axis that extends between the force applicator element and the mounting element. A breakable spot mounting is illustrated at 52. Spot mounting 52 mounts anchor member 50 to plate 56. Preferably, a spot mounting is located as close as possible to the force applicator element. This, inter alia, reduces the moment arm of the force applied to the spot mounting, and tends to protect it from unintentional breakage. A detent element 48 in the form of a thumb screw is illustrated at 48. Detent element 48 serves to prevent the mounting element and the anchor member from unintentionally disengaging by sliding axially of one another. The end rim of anchor member 50 provides a multiplicity of spot mounting locations as indicated at 60, 62, 64, and 66. When breakable spot mounting 52 is broken to release the anchor member from the plate, a fresh spot mounting location on the rim can be selected for purposes of remounting the anchor member to a new location on the same or a different plate. No reworking is required of the location on the rim where the spot mounting 52 was accomplished. Cycle time for mounting, using, de-mounting, and remounting is thus reduced.

Some locations are such that there is not room or it is awkward to slide the sectorial socket portion of the mounting element over the anchor element. The embodiment of FIG. 6 illustrates the side mounting of a mounting element 70 over anchor member 50. One arm 74 of the mounting socket is pivotally mounted at 72 so that it swings to the open position illustrated at 76. This is in the nature of a clam shell coupling, and it permits the mounting element to be moved sideways into engagement with the anchor member without any axial sliding of one relative to the other. A conventional detent, not shown, is provided to hold clam shell element 74 in the engaged configuration.

Figure 9:
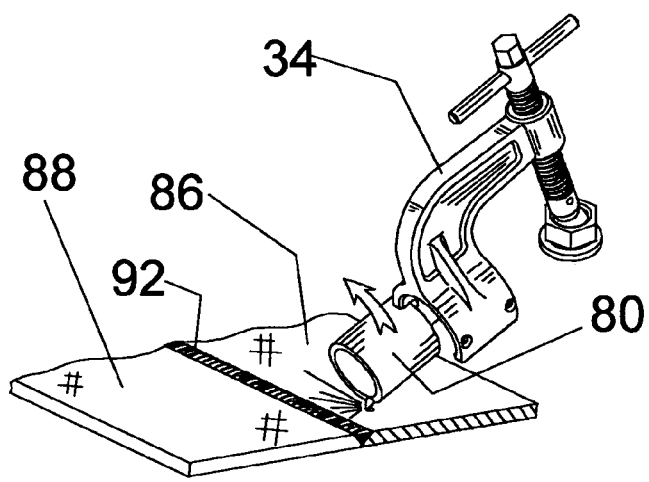
FIG. 9 is a perspective view of the embodiment of FIG. 8 illustrating the removal of a spot welded anchor member from a welded plate assembly.
Figure 10:
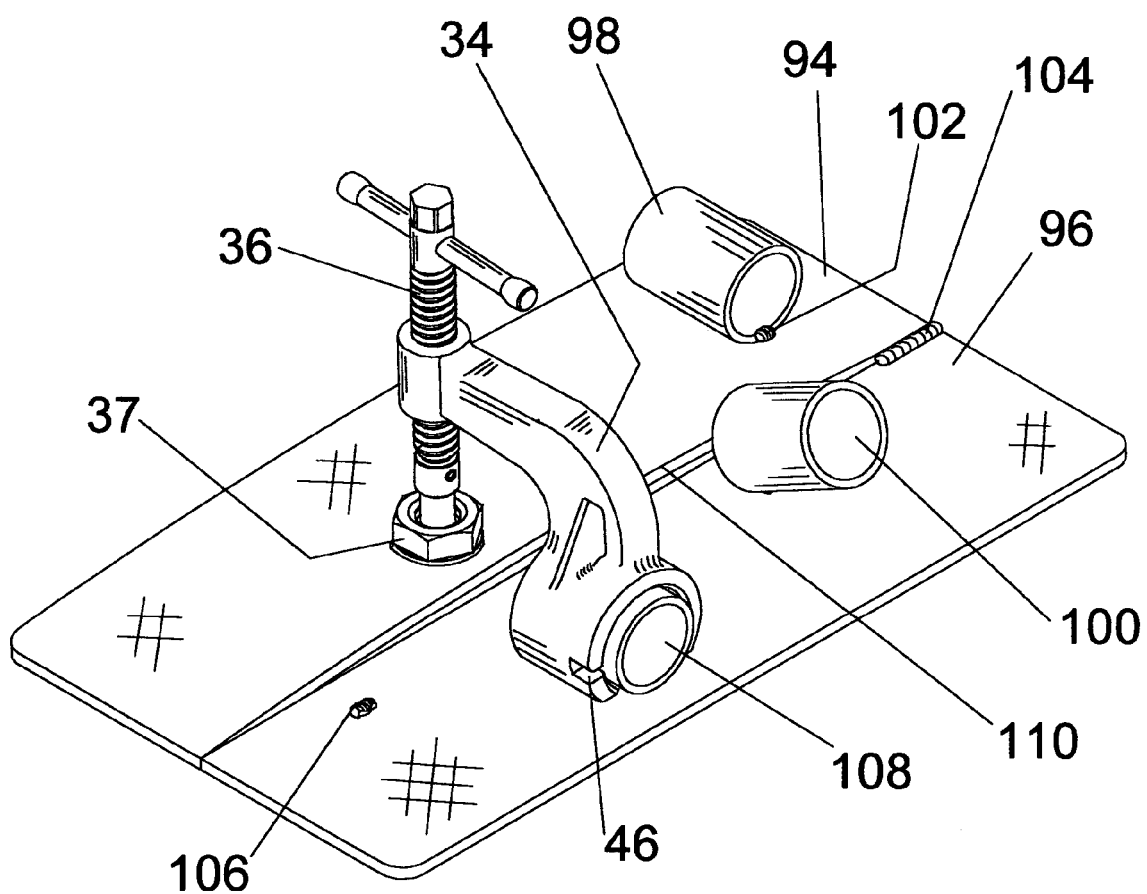
FIG. 10 is a perspective view of a preferred embodiment according to the present invention illustrating several stages in the use of the present invention illustrating the best mode of practicing the invention as presently understood.

FIGS. 7 through 10 illustrate the operation of one embodiment of the invention. Anchor member 80 is breakably spot welded to first plate 86 by means of a welding member 84. As shown particularly in FIG. 7, a second plate 88 is positioned generally adjacent to but misaligned with first plate 86 so that the plates can not be welded at juncture 90. Clamp body member 34 is assembled to anchor member 80 by sliding the mounting element 40 and generally cylindrical anchor member 80 axially of one another into a nested relationship. As illustrated particularly in FIG. 8, the incremental application of force by means of rotating threaded force applicator 36 causes a downward force to be applied to plate 88, and an upward force to be applied to plate 86. This brings the two plates into alignment at their adjacent edges. The juncture 90 is welded at 92 (FIG. 9). Anchor member engaging slot 46 on clamp body member 34 is engaged with the remote rim of anchor member 80 and upward force is applied to break the spot weld 82. The anchor member 80 is then available for re-use at another location on the same or a different plate.

Often, large plates require alignment one segment at a time. This is diagrammatically illustrated, for example, in FIG. 10. First plate 94 and second palte 96 are misaligned, and the misalignment is of such a nature that it must be addressed one segment of the juncture between them at a time. A first anchor member 98 was spot mounted at 102 to first plate 94, a clamp member 34 was mounted thereto and adjusted, and first weld 104 was formed. The misalignement of the next segment of the juncture between these plates is illustrated, for example, at 110. Clamp member 34 was slidably removed from engagement with first anchor member 98, and slidably installed on third anchor member 108. The removal of an anchor member from the surface of a plate is illustrated at 100 where the free end of the anchor has been twisted up away from the plate around the spot mounting at the other end so as to weaken and break the spot mounting. Once complete removal of the anchor is accomplished, it is available for re-use on the same or a different plate. The spot mountings are on the rims of the anchor members that are closest to the juncture between the plates. Removal of an anchor leaves a spot of weldment on the surface of the plate as illustrated at 106. Typically, weldments are ground to smooth them. Grinding of the spot of weldment 106 serves to level the surface of the plate as may be desired.

Figure 11:
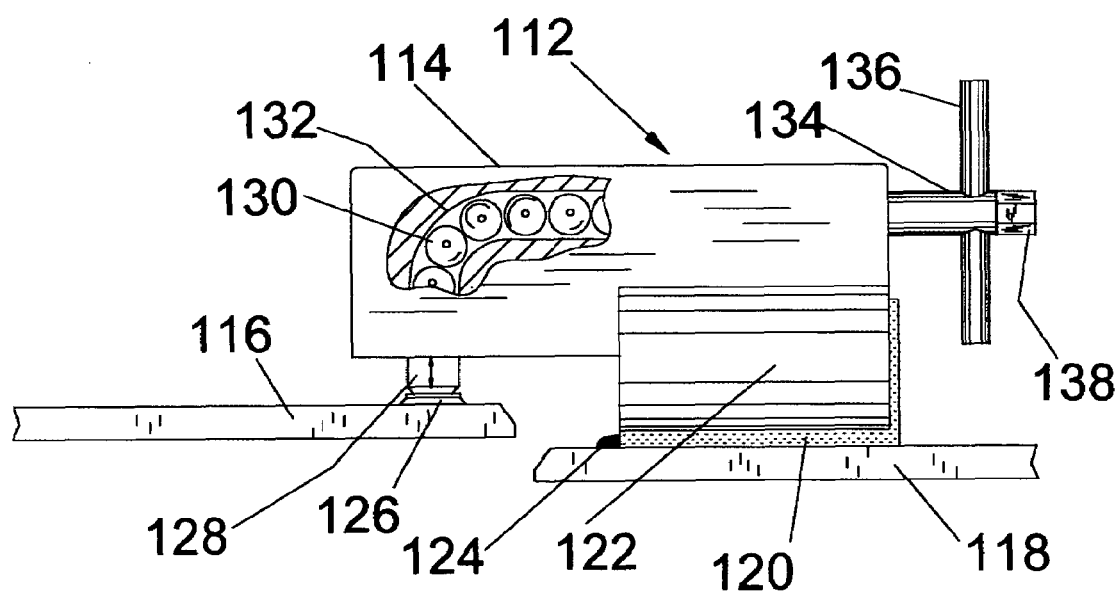
FIG. 11 is a partially broken side elevational view of an additional preferred embodiment wherein a force applicator is actuated from a side of the assembly.

A further embodiment of the invention is diagrammatically illustrated in FIG. 11. In some situations it is desirable to be able to actuate the force applicator from one side of the clamp body. A clamp alignment assembly 112 includes a force applicator element 128 that is actuated by a laterally projecting threaded actuator 134. Actuating force is applied to actuator 134 by the rotation through T-handle 136 or hex head 138 of a shank that is threadably mounted in clamp body member 114 so as to incrementally drive transmitting spheres 130 along actuator channel 132. A floating foot pad or jaw 126 on the remote end of force applicator element 128 serves to accommodate slight angular misalignment between the first plate 116 and second plate 118. Mounting element 122 is slidably mounted in nesting relationship to generally cylindrical member 120. Anchor member 120 is attached by a spot mounting 124 at a rim location adjacent to force applicator 128 to second plate 118. Movement of the force applicator element 128 responsive to the urging of force transmitting spheres 130 will cause the adjacent edges of plates 116 and 118 to move into alignment with one another.

Figure 12:
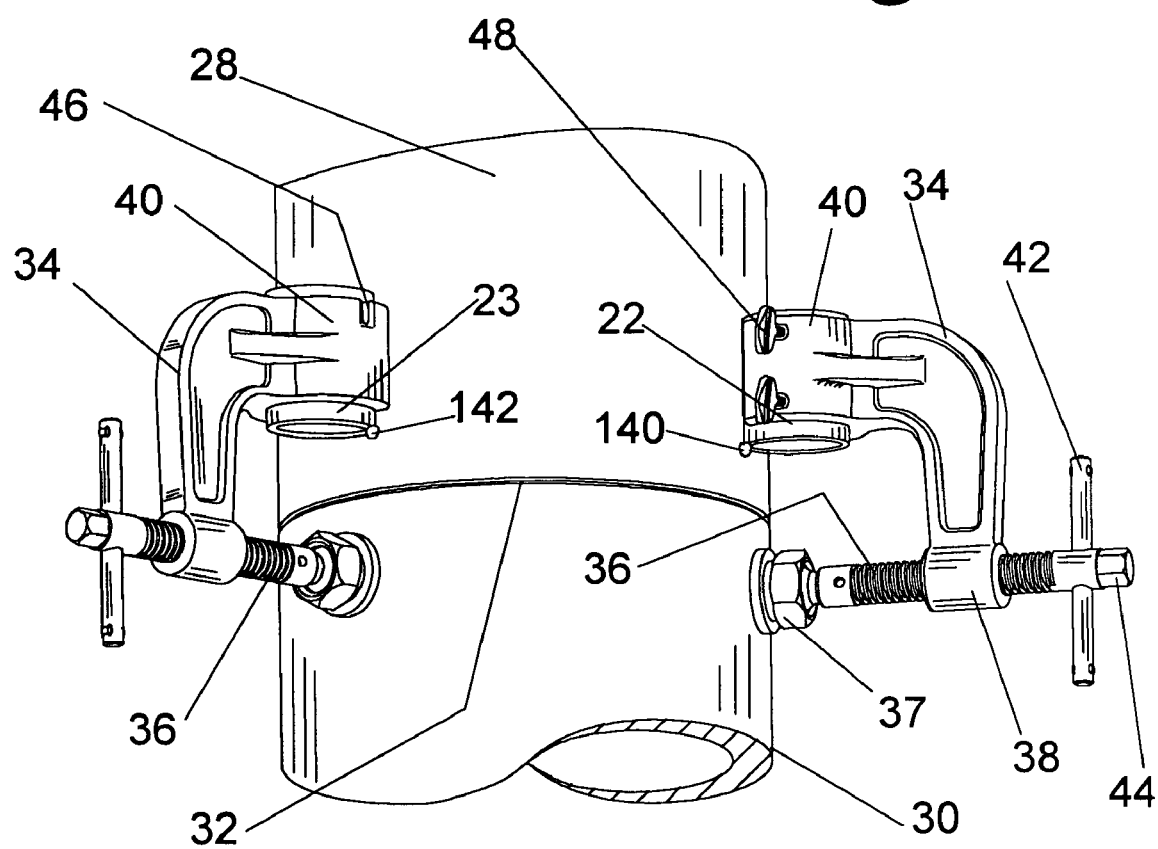
FIG. 12 is a view similar to FIG. 4 illustrating in some additional detail the best mode of practicing the invention as presently understood.

FIG. 12, for example, is illustrative of the best mode as presently contemplated of the clamp assemblies according to the present invention. The clamp body 34 is in the form of an inverted L-shape clamping arm and webbed for added strength. Thumb screws, of which 48 is typical, are provided for detent purposes so that no extra tools are required to actuate these detents. The threaded socket 38 is reinforced as illustrated for strength purposes. The threaded actuator 36 for applicator element 37 is incrementally actuatable by means of T-handle 42 or hex head 44. In general, a third clamp assembly, not illustrated would typically be applied to the opposed side of the pipes 28 and 30 generally as described above with reference to FIG. 4 to align the edges of the curved plates along juncture 32. Spot welds 140 and 142 serve to breakably mount the respective anchor members 22 and 23 to pipe 28. Curved plates are used to illustrate this embodiment so that both sides of the clamp assemblies are visible. The geometry of the plates is not a part of the alignment clamp assemblies. The plates are the workpieces to which the clamp assemblies of this invention are applied. The use of curved plates in FIG. 12 is not intended to indicate that the invention or the best mode of practicing the invention are limited by the geometry of the plates.

Several sets of alignment clamps can be used to align the adjacent edges of the plates with fine adjustment and desired accuracy. Alternatively, one clamp can be used in one location with a partial weld formed as the desired alignment is achieved at that location. That one clamp can then be moved to another location, and the process repeated. This cycle of use can be repeated until the entire weld is formed. In one specific embodiment, several two and one-eighth long pieces of one and seven-eighth inch diameter metal pipe were spot welded to the surface of the metal plate along the welding edge, with the axis of each metal pipe parallel to the surface of the second metal plate but at right angle to the edge to be welded. An alignment clamp was mounted onto each plate. To align the edges of the plates to the same level, the threaded screw of the alignment clamp was turned until the edges of the plates were brought into alignment by raising one or lowering the other. Accurate alignment of the two edges was obtained by fine adjustments of the threaded screws of each alignment clamp. Then the two metal plates were welded together along the aligned edges in one operation. After the weld cooled down, the alignment clamps were removed from the one and seven-eighth inch short pipes by releasing the screws and sliding the clamp bodies off the pipe sections. The final steps of the process were to remove the one and seven-eighth inch diameter short pipes by striking them with a hammer or prying them off, and to polish the surface of the metal plate where the spot weld was located.

What have been described are preferred embodiments in which modifications and changes may be made without departing from the spirit and scope of the accompanying claims. Many modifications and variations of the present invention are possible in light of the above teachings. It is therefore to be understood that, within the scope of the appended claims, the invention may be practiced otherwise than as specifically described.

What is claimed is:

1. An alignment clamp assembly for aligning first and second plates comprising:

a clamp body member including a mounting element and a force applicator element, said mounting element being generally laterally spaced from said force applicator element and including a generally arcuately extended semi-cylindrical socket portion;

an anchor member, said anchor member being generally cylindrical and including a generally cylindrical external surface and generally axially opposed end rim portions, each of said end rim portions including a plurality of generally circumferentially disposed spot mounting locations, said anchor member being adapted to being breakably spot affixed to said first plate at one of said spot mounting locations, said generally arcuately extended semi-cylindrical socket portion being adapted to engaging and disengaging said anchor member, said mounting element being adapted to applying a first force in a first direction through said anchor member to said first plate, said force applicator element being adapted to applying a second force in a second direction to said second plate, said first and second directions being generally opposed to one another, at least one of said mounting and force applicator elements being incrementally adjustable generally along one of said first and second directions.

2. An alignment clamp assembly of claim 1 wherein said anchor member is spot welded to said first plate.

3. An alignment clamp assembly of claim 1 wherein said at least one of said mounting and force applicator elements is incrementally adjustable through a threaded element.

4. An alignment clamp assembly of claim 1 wherein said force applicator element comprises a threaded element.

5. An alignment clamp assembly of claim 1 wherein said generally arcuately extended semi-cylindrical socket portion is adapted to slidably engaging and disengaging said anchor member.

6. An alignment clamp assembly of claim 1 wherein said anchor member is adapted to being breakably spot affixed to said first plate at a said spot mounting locations with said generally cylindrical surface generally parallel to a surface of said first plate.

7. An alignment clamp assembly of claim 1 including releasable fastening members adapted to retaining said clamp body member engaged with said anchor member.

8. A process of aligning first and second plates comprising:
   selecting an anchor member, said anchor member being generally cylindrical, said anchor member including a generally cylindrical outer surface and generally axially opposed end rim portions, each of said end rim portions including a plurality of spot mounting locations circumferentially disposed thereof;
   breakably spot affixing a first of said spot mounting locations to a first spot on said first plate with said generally cylindrical outer surface in contact with a surface of said first plate;
   selecting a clamp body member including a mounting element and a force applicator element, said mounting element including a generally arcuately extended semi-cylindrical socket portion adapted to receiving said anchor member therewithin, said mounting element being laterally spaced from said force applicator element, said mounting and force applicator elements being adapted to exerting generally opposed forces on said first and second plates;
   engaging said generally arcuately extended semi-cylindrical socket portion with said anchor member;
   adjustably applying said opposed forces to said first and second plates and allowing said plates to move relative to one another to predetermined positions;
   affixing said plates in said predetermined positions at a location adjacent to said mounting element;
   disengaging said generally arcuately extended semi-cylindrical socket portion from said anchor member;
   breaking said anchor member away from said first spot; and
   breakably spot affixing a second of said spot mounting locations to a second spot on one of said plates.

9. A process of claim 8 wherein said first spot mounting location is on a first of said end rim portions, and positioning said second spot mounting location on a second of said end rim portions.

10. A process of claim 8 wherein said first spot mounting location is on a first of said rim portions, and positioning said second spot mounting location on said first rim portion at a position circumferentially spaced from said first spot mounting location.

11. A process of claim 8 wherein said generally arcuately extended semi-cylindrical socket portion is adapted to slidably receiving said anchor member therewithin, and slidably engaging and disengaging said generally arcuately extended semi-cylindrical socket portion from said anchor member.

12. A process of claim 8 including selecting said first spot on said first plate and said second spot on said second plate.

13. A process of claim 8 including selecting said first spot on said first plate and said second spot on said first plate.

14. An alignment clamp assembly for aligning first and second plates comprising:
   a clamp body member including a mounting element and a force applicator element, said mounting element being generally laterally spaced from said force applicator element generally at opposed ends of a lateral axis and including a sectorial socket portion, said sectorial socket portion having a generally cylindrical wall from which a segment has been removed and a socket axis extending generally coincident with a longitudinal axis of said generally cylindrical wall;
   an anchor member, said anchor member being generally cylindrical and having an anchor axis extending generally longitudinally of said anchor member, said anchor member including a generally cylindrical external surface and generally axially opposed end rim portions, each of said end rim portions including a plurality of generally circumferentially disposed spot mounting locations, said anchor member being adapted to being breakably spot affixed to said first plate at one of said spot mounting locations with said generally cylindrical surface generally parallel to a surface of said first plate, said sectorial socket portion being adapted to being slidably mounted over said anchor member while said anchor member is breakably spot affixed to said first plate and with said socket axis generally coincident with said anchor axis, said mounting element being adapted to applying a first force in a first direction through said anchor member to said first plate, said force applicator element being adapted to applying a second force in a second direction to said second plate, said first and second directions being generally opposed to one another and generally normal to said lateral, socket and anchor axes, at least one of said mounting and force applicator elements being incrementally adjustable generally along one of said first and second directions.

15. An alignment clamp assembly of claim 14 including a detent member adapted to holding said sectorial socket portion mounted to said anchor member.

16. An alignment clamp assembly of claim 14 wherein said force applicator element includes a floating pad adapted to contact and adjust to an angular position of a surface of a said plate.

17. An alignment clamp assembly of claim 14 wherein said segment is of such an extent that said sectorial socket portion is adapted to rotate through an arc of less than approximately 90 degrees around said anchor axis.

* * * * *